US010717672B2

(12) United States Patent
Loh et al.

(10) Patent No.: US 10,717,672 B2
(45) Date of Patent: Jul. 21, 2020

(54) MULTIFUNCTIONAL CEMENT COMPOSITES WITH LOAD-BEARING AND SELF-SENSING PROPERTIES

(71) Applicant: THE REGENTS OF THE UNIVERSITY OF CALIFORNIA, Oakland, CA (US)

(72) Inventors: Kenneth Loh, San Diego, CA (US); Jesus Gonzalez, Bay Point, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 880 days.

(21) Appl. No.: 15/157,079

(22) Filed: May 17, 2016

(65) Prior Publication Data
US 2016/0340245 A1 Nov. 24, 2016

Related U.S. Application Data

(60) Provisional application No. 62/165,847, filed on May 22, 2015.

(51) Int. Cl.
C04B 14/00 (2006.01)
C04B 14/02 (2006.01)
G01N 27/20 (2006.01)
G01N 27/04 (2006.01)
C04B 20/10 (2006.01)
(Continued)

(52) U.S. Cl.
CPC ........ C04B 14/026 (2013.01); C04B 20/1029 (2013.01); C04B 28/02 (2013.01);
(Continued)

(58) Field of Classification Search
CPC ...... C04B 14/26; C04B 14/005; C04B 14/026
(Continued)

(56) References Cited

U.S. PATENT DOCUMENTS 7,666,327 B1 * 2/2010 Veedu .................... C04B 28/02
106/717
7,713,448 B1 * 5/2010 Veedu .................... B82Y 30/00
106/717

(Continued)

OTHER PUBLICATIONS

Han et al. "A self-sensing carbon nanotube/cement composite for traffic monitoring", Nanotechnology, 20, 2009, 445501. Published online Oct. 7, 2009 (Year: 2009).*

(Continued)

*Primary Examiner* — Jane L Stanley
(74) *Attorney, Agent, or Firm* — Sheppard, Mullin, Richter & Hampton LLP

(57) ABSTRACT

A method for creating multifunctional cementitious composites that provide load-bearing and self-sensing properties. The method involves dispersing conductive nanomaterials (e.g., multi-walled carbon nanotubes) into a polymer (e.g., latex) material from which a thin film is created and deposited (e.g., sprayed) onto aggregates, which after drying, can be incorporated with cementitious materials and desired liquids and cast, along with sufficient number of electrodes, into a form for curing. After curing, the resultant structure can be electrically tested through the electrodes, for structural characteristics, including determination of damage severity and location using back-calculation utilizing electrical resistance tomography (ERT), or electrical impedance tomography (EIT), to generate a spatial resistivity map (distribution).

13 Claims, 10 Drawing Sheets

(51) Int. Cl.
    *C04B 28/02*     (2006.01)
    *C04B 111/94*     (2006.01)
    *C04B 111/00*     (2006.01)

(52) U.S. Cl.
    CPC ........... *G01N 27/043* (2013.01); *G01N 27/20* (2013.01); *C04B 2111/00008* (2013.01); *C04B 2111/94* (2013.01)

(58) Field of Classification Search
    USPC ........................................................ 428/323
    See application file for complete search history.

(56) References Cited

U.S. PATENT DOCUMENTS

| | | | |
|---|---|---|---|
| 7,875,211 B1* | 1/2011 | Veedu ..................... | C04B 28/02 106/717 |
| 8,377,278 B1* | 2/2013 | Cardenas ............ | E04G 23/0218 204/450 |
| 8,871,019 B2* | 10/2014 | Binhussain ............. | C04B 28/02 106/644 |
| 8,992,681 B2* | 3/2015 | Binhussain ............. | C04B 28/02 106/644 |
| 2017/0066690 A1* | 3/2017 | Schoneveld ............ | C04B 26/02 |
| 2019/0202738 A1* | 7/2019 | Li .......................... | C04B 18/08 |

OTHER PUBLICATIONS

Chen et al. "Carbon fiber reinforced concrete for smart structures capable of non-destructive flaw detection", Smart Mater. Sctruct. vol. 2, No. 1, 22-30. Published Mar. 1993 (Year: 1993).*

* cited by examiner

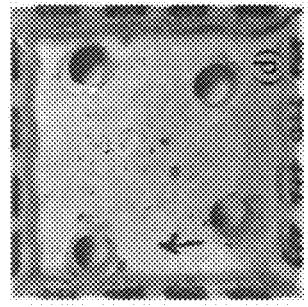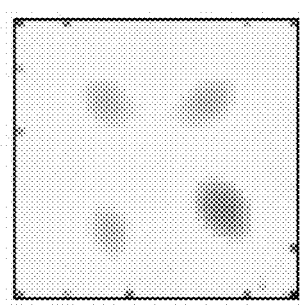
FIG. 10D FIG. 10H
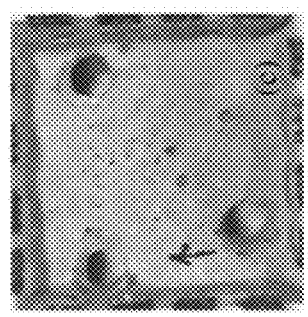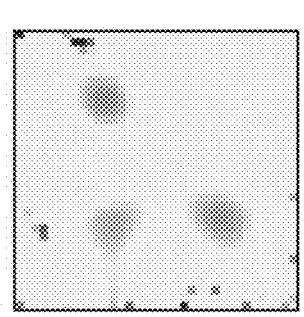
FIG. 10C FIG. 10G
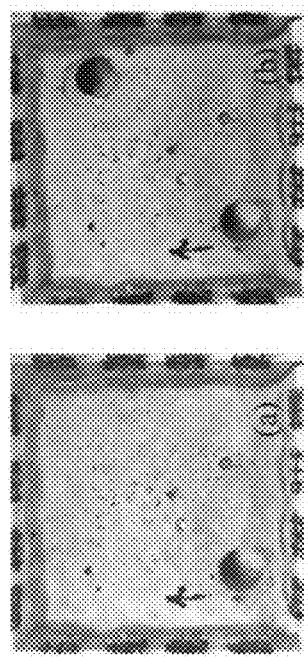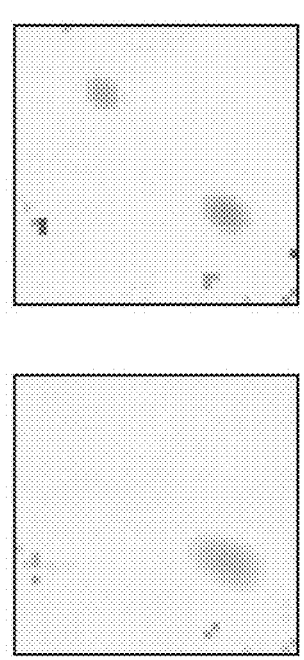
FIG. 10B FIG. 10F
FIG. 10A FIG. 10E

MULTIFUNCTIONAL CEMENT COMPOSITES WITH LOAD-BEARING AND SELF-SENSING PROPERTIES

CROSS-REFERENCE TO RELATED APPLICATIONS

This application claims priority to, and the benefit of, U.S. provisional patent application Ser. No. 62/165,847 filed on May 22, 2015, incorporated herein by reference in its entirety.

STATEMENT REGARDING FEDERALLY SPONSORED RESEARCH OR DEVELOPMENT

This invention was made with Government support under 13-G-017, awarded by the Federal Aviation Administration (FAA), and under CMMI-1200521, awarded by the National Science Foundation (NSF). The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to testing of cementitious composite materials, and more particularly to a nano-engineered cementitious composite capable of self-sensing and detecting damage.

2. Background Discussion

Cementitious composites, such as concrete pavements, structural components (e.g., beams and columns in buildings), bridge superstructures, foundations, tunnels, and dams, to name a few, are susceptible to different damage modes, which are primarily caused by repeated loading, severe operating environments, and long-term deterioration. For the case of concrete pavement as an example, there is even greater concern that damage could worsen and occur more frequently with the use of heavier vehicles/trucks or new larger aircraft carrying greater payloads. The same is true for civil infrastructure construction, where cement composites are being pushed to their performance limits for construction projects involving skyscrapers, for unique and longer bridge designs, and for structures in seismically active regions.

Damage to the concrete can stem from unanticipated extreme loads, long-term degradation, fatigue, and environmental effects, among others. In fact, cracks can form in response to tension, cyclic loads (fatigue), and freeze-thaw cycles. Specifically, freeze-thaw cycles cause water in the pores of the cementitious matrix to expand (when frozen) and create new cracks or widen existing cracks. Effects such as these exacerbate damage by allowing water, air, and other chemicals to seep beneath the surface, degrade the passivation layer, and induce corrosion of steel reinforcement bars. Corrosion byproducts (or rust), like ice, take up more volume and can cause additional cracking or spalling of the concrete cover. Over time, deterioration and damage can propagate to cause catastrophic structural collapse.

Thus, detecting the onset and monitoring the progression of damage is of critical importance for facilitating necessary maintenance and for preventing catastrophic failure. For the specific case of cementitious composite structures (e.g., bridges and concrete pavements), the approaches for detecting damage can be classified as either destructive or nondestructive. A common destructive test is core sampling, in which a core sample of a specified diameter and depth is drilled and extracted from an existing concrete structure. The specimen is then subjected to laboratory tests for characterizing its mechanical properties, as well as to infer any possible deterioration occurring in the structure. While this approach provides invaluable information about the concrete structure, it has the drawback of altering the structure and potentially creating a "weak-spot" in which damage can initiate and occur in the future.

In contrast, nondestructive testing (NDT) does not alter the structure but instead utilizes technologies or methods that extract structural response data that are correlated to damage. To date, visual inspection is usually the most common NDT method employed for monitoring concrete structures. Despite its widespread use, visual inspection remains time-, cost-, and labor-intensive and can be subjective. Taking digital images of suspected damaged regions and the application of image processing techniques enable quantification of damage, but the technique is limited to surface features. On the other hand, acoustic emission (AE) is another NDT technique that uses ultrasonic transducers to characterize changes in the acoustic properties of the structure due to damage (e.g., cracks), which is mechanistically similar to impact-echo and chain dragging methods. The drawbacks of AE include its inability to detect pre-existing damage and its susceptibility to ambient noise.

Thus, it is seen above that mitigating catastrophic failure currently requires significant levels of testing in processes that are costly and often problematic.

Accordingly, a need exists for mechanisms to facilitate testing of concrete structures. The present disclosure fulfills this need and provides additional benefits in regard to various concrete structures.

BRIEF SUMMARY

A nano-engineered cementitious composite with capabilities of self-sensing or detecting damage, in addition to its intrinsic load-bearing, structural-use properties. The approach enhances the ability to sense damage in cementitious composites by incorporating conductive nanomaterial additives, such as carbon nanotubes (CNT) or multi-walled carbon nanotubes (MWNT), or similar, as part of the mix.

However, as opposed to directly dispersing conductive nanomaterials (e.g., CNTs or MWNTs) in the cement matrix, as is performed in current state-of-art techniques, the disclosure provides a new paradigm in which conductive nanomaterial-latex thin films are used to coat aggregate particles (i.e., sand and/or rock) for use as part of the mix design for casting cement composite specimens. Cement composite specimens created in this manner were subjected to compressive cyclic loading tests while their electrical properties were recorded simultaneously. The results showed that the electrical properties of these cementitious composites designed with conductive nanomaterial film-coated aggregates exhibited extremely high strain sensitivities suitable for various applications, including traffic/load monitoring, sensing damage, and detecting strains/deformations due to changes in temperature/climate, among many others. Their intrinsic load carrying properties were also preserved.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 10A through FIG. 10H are images of damaged cast plates of MWNT-latex cementitious composite (FIG. 10A through FIG. 10D), and associated spatial resistivity map images (FIG. 10E through FIG. 10H) obtained according to an embodiment of the present disclosure.

DETAILED DESCRIPTION

1. Introduction

Figure 1:
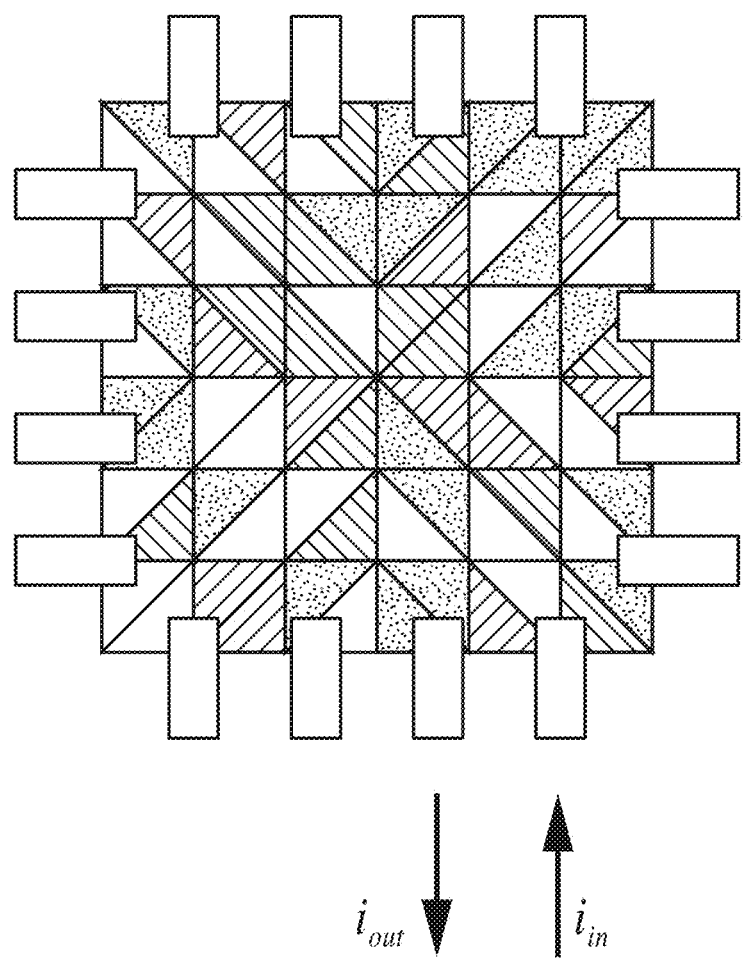
FIG. 1 is a rendition of a finite element model of a body generated using triangular elements with linear basis functions, that can be utilized with the ERT and EIT methods according to the present disclosure.

Concrete and other cementitious composites used in civil infrastructure are prone to numerous forms of damage. For example, cracks can arise and propagate to cause catastrophic component or system level failure. The present disclosure describes a nano-engineered self-sensing cementitious composite that can detect and locate damage.

Conventional methods of creating smart concrete or multifunctional cement composites have basically relied on mixing carbon nanotubes (or other nanomaterials), either in its dry state, dispersed in a solution, or dispersed in superplasticizer solutions, directly with the mix with other raw materials. The underlying concept of these approaches is to disperse nanotubes within the cement composite matrix, such that the nanotubes could interact and form a percolated structure for conducting electricity (and for sensing) and enhancing strength.

However, a number of disadvantages arise from this approach, including the following. (1) Very high nanotube concentrations are required in order to modify the intrinsic material properties of concrete or cement composites (see the first two rows of Table 5). (2) It represents a significant burden (e.g., capital investment, labor, time, and other costs) to disperse such a large amount of nanotubes in different solutions. (3) Actual cost in using such as large amount of carbon nanotubes is very high. (4) Addition nanotubes in the cement matrix or mix impacts workability of the mix, thus requiring other additives if the mix is to be used in the same conditions as what contractors and end-users require. (5) At these high nanotube concentrations, the intrinsic properties of concrete become different, for example color changes, becoming more conductive (e.g., can cause lightning strikes), absorbing more heat and contributing to the heat-island effect, as well as other changes in properties. (6) Dispersion of nanotubes in the material is difficult, whereby even higher concentrations are required than indicated by these approaches. (7) Despite the large concentrations of costly nanotubes utilized, there is an insignificant enhancement of material properties. (8) The technique is not scalable, such that only small-sized specimens can be cast for real-world applications.

Another more recent development toward creating multifunctional cement particles was created by directly growing nanomaterials (such as carbon nanotubes) onto cement particles. This technique is significantly more innovative and shows great potential, but it too suffers from several limitations, as described as follows. (1) Growth of nanomaterials on cement matrices require specialized equipment. (2) The process is only amenable to producing small quantities at a time. (3) It is a time-consuming process. (4) The Technique is not scalable to large applications typically required in fabricating concrete structures.

2. Multifunctional Cement Composites of Present Disclosure

In contrast, the method of the present disclosure addresses the aforementioned limitations. In particular, the disclosed method modifies the interface between the sand (or aggregate) particles and the cement matrix with an additional interfacial layer formed by conductive nanomaterial-polymer combination (e.g., CNT-latex or MWNT-latex) thin films.

In the following disclosure, examples of these conductive nanomaterial-polymer thin films are described as carbon nanotube (CNT)-latex, or multiwalled carbon nanotube-latex, however, it should be appreciated throughout this discussion that other conductive nanostructures can be utilized separately, or in combination, with polymeric media (aside from only latex) that is capable of being applied to the aggregate materials.

The advantages of the disclosed composite and fabrication methods are as follows. (1) The conductive nanomaterial-polymer films are fabricated by airborne dispersion (airbrushing), which is controlled, rapid (order of a few minutes), low-cost, efficient, and simple. (2) The conductive nanomaterial-polymer films require only a very small quantity of nanotubes or other nanomaterials (hence low cost) and can cover very large areas by depositing micron-thick thin films onto the sand/aggregate surfaces. This modified aggregate is then dispersed within the cement composite, hence distributing nanomaterials everywhere in the material. (3) The process for modifying the sand-cement interface does not require specialized or high-cost investment. (4) By depositing thin films onto sand or other aggregates, the films themselves preserve the dispersion of nanotubes so that no extra amount is required during casting. (5) Film-coated sand particles or aggregates do not affect the workability of the cement composite mix. Hence, industry accepted casting procedures can continue to be used. (6) The concrete color is not impacted by this process. (7) Electrical conductivity is enhanced, by 10-20%, and despite this small change, the mechanism built into the cement composite enables high performance damage detection and sensing to be performed. (8) The material property enhancements are significant, for example significant increases in strain or damage sensitivity was quantified in the laboratory. (9) The preparation and casting procedures are scalable and amenable to large-scale construction.

A multifunctional cementitious composite is disclosed that can be utilized as a structural or load-bearing material while providing the added functionality of sensing strain and damage. Instead of directly dispersing a large amount of conductive nanomaterials (e.g., carbon nanotubes (CNTs) and/or multi-walled nanotubes (MWNTs)) in the cement matrix, this approach focuses on modifying the cement-aggregate interface of cement composite specimens with conductive nanomaterial-based thin films. In testing the suitability of this approach, air dispersion (e.g., an airbrush) was utilized for depositing a thin layer of the electrically conductive nanomaterial-polymer (e.g., latex) thin films onto dry sand (aggregate). The film-coated sand (aggregate) was then used for casting cement composite specimens. Upon casting, cement composite specimens were subjected to compressive and cyclic load tests for characterizing their mechanical and sensing properties. Once the cement composite's electrical properties were calibrated to applied strains, an electrical resistance tomography (ERT) (or electrical impedance tomography (EIT)), method was implemented and used for estimating the specimen's spatial distribution of electrical resistance. In doing so, direct spatial sensing and damage identification can be accomplished, since localized changes in electrical resistance would infer the presence of cracks, spalling, or other types of damage.

2.1 Electrical Resistance Tomography Background.

Electrical resistance tomography (ERT), which is a subset of the broader domain of electrical impedance tomography (EIT), is a well-known soft-field tomography technique, and its development and applications can be traced back to the biomedical domain. ERT and EIT seek to reconstruct the spatial distribution of resistance and impedance, respectively, of a conductive body using only applied electrical input and measured output signals along boundaries of the body. In that regard, ERT and EIT use experimental data of input current and boundary voltage measurements for solving the inverse problem to reconstruct the spatial conductivity map of the body of interest.

FIG. 1 depicts an example of a finite element model of a body generated using triangular elements with linear basis functions, that can be utilized with ERT and EIT methods according to the present disclosure. The body is shown as a square cementitious composite plate into which a plurality of electrodes about its periphery were cast (4×4), in which currents $i_{in}$ and $i_{out}$ between different electrode pairs were created in the process of testing the structure of the cementitious composite.

To understand the ERT and EIT spatial conductivity mapping inverse problem, one must first consider the "forward problem." Using the 2D Laplace's equation, $$\nabla \cdot [\sigma(x,y) \nabla v(x,y)] = 0 \quad (1)$$

one can calculate the body's boundary potential or voltage distribution (v) given a known electrical current source/sink and the body's conductivity distribution ($\sigma$) represented by a Cartesian coordinate system. Eq. (1) refers to the specific case in which electrical current is neither supplied nor generated within the 2D body, $\Omega$. No discrete electrodes are defined in this continuum model. Instead, electrical current is defined as a continuous current function along the boundary, $\partial \Omega$.

Given the complexity of the ERT and EIT problem and the inability of applying a continuous boundary current function to $\Omega$, the forward problem is often solved using a discretized weak formulation in conjunction with the finite element method (FEM) (FIG. 1). Eq. (2) shows the weak form of Laplace's equation:

$$\iint_\Omega \sigma \nabla \phi \nabla v \, dx dy = 0 \quad (2)$$

where $\phi$ is the shape function of voltage at the electrodes. FEM and discretization allows the incorporation of discrete boundary electrodes, which is more practical than applying a continuous boundary current function. In addition, each FEM element assumes a constant value of conductivity or resistivity.

While the forward problem can be solved using Eq. (2), ERT and EIT involve solving the "inverse problem." Given a physical $\Omega$ with a set of discrete boundary electrodes, one can simply apply a direct current (DC) at one electrode, set another electrode as ground, and measure the potential drops or voltage differences at remaining pairs of boundary electrodes ($V_{exp}$), as shown in FIG. 1. Here, $\sigma(x,y)$ is unknown. Thus, solving the inverse problem begins by assuming a conductivity distribution so that the forward problem can be executed to determine the predicated boundary voltages ($v_{num}$). In the present disclosure, a Gauss-Newton iterative process was implemented for updating the conductivity distribution of the body until the error difference (e) between experimental and predicted voltages was below a certain threshold as indicated in Eq. (3):

$$e = \|v_{exp} - v_{num}\|^2 \leq 0.05\% \quad (3)$$

The nature of ERT reconstruction is an ill-posed inverse problem, which necessitates the inclusion of some prior regularization information in the reconstruction process.

2.2 Example of Mix Design and Casting.

Fabrication or casting of the multifunctional cement composite proceeded as follows. The cementitious material used was a mixture of Type I/II Portland cement and 25 wt. % (of total cementitious material) Type F ground granulated blast furnace slag (GGBFS). Specimens were cast using a 2.75:1 sand-to-cement ratio. The sand used was crushed granite with a density of 2.71 g/cm$^3$ and a minimum particle size of 0.149 mm. Prior to its use and/or the deposition of the MWNT-latex thin film, sand was dried in a vacuum oven at 80° C. for 24 hours. A water-to-cement ratio of 0.52 was used, along with 2.9 mL/kg of Advacast superplasticizer (SPL), to reduce water content and to increase mix workability. It should be appreciated that the specifics above, and elsewhere in this disclosure, regarding mixing ratios and curing procedures are provided by way of example, and not of limitation, as the teachings of present disclosure can be applied across a wide range of mix and curing profiles.

In these tests casting the cement composite specimens began with mixing the various constituents (e.g., in these tests using a Hobart N-50 mixer). First, the cementitious material, water, and Advacast SPL were mixed at a low speed of 60 RPM for 30 seconds. While the mixer was still operated at 60 RPM, sand (i.e., either pristine or coated with the CNT-based thin film) was gradually added. Upon doing so, the mixer was set to medium-speed (124 RPM) for 1 minute, so as to obtain an even mixture. Then, the mixer was turned off, and any material on the walls of the bowl was scraped off. Finally, the mixture was set aside for 15 seconds before being poured into individual molds.

Different types of molds were utilized for casting mortar specimens, a first was a mold of 5×5×5 cm (~2×2×2 inches). To facilitate testing of their electrical properties during applied strains and stresses, conductive (e.g., copper mesh) electrodes were cut and inserted at opposite ends in molds designated for electromechanical characterization. The placement of these electrodes was such that the mesh covered the entire cross-section of the specimen, while having a small portion extended outwards to facilitate electrical connectivity. Material was inserted into the mold, it was tamped, then sealed and allowed to cure for 24 hours, then demolded and allowed to cure for 28 days.

Figure 2:
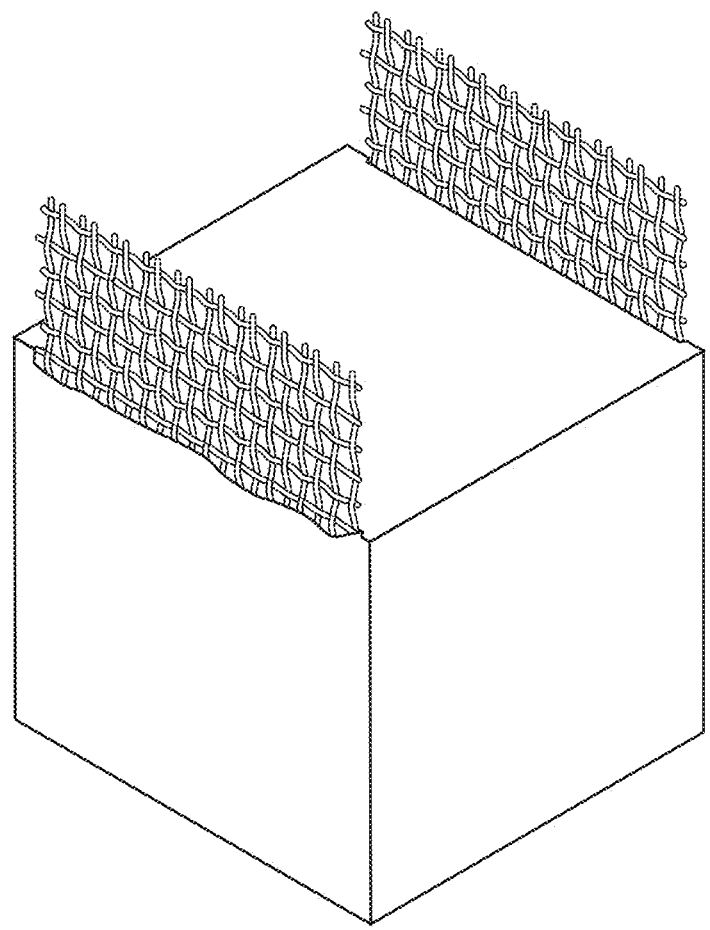
FIG. 2 is an image rendition of a molded specimen utilized for compression testing of the MWNT-latex cementitious composite.

FIG. 2 illustrates an example of the molded specimen described above upon removal from its mold.

In a second sample set molds were used for casting plate specimens (25×12.5×1 cm) for use in spatial damage detection validation tests. Since used for ERT testing, a plurality of conductive electrodes (i.e., copper tape) were arranged about the periphery of the mold. The molds were filled, tamped, vibrated, and the same curing procedure utilized as with the previous samples.

2.2 Example of Nanocomposite Fabrication and Sand Coating.

First, MWNTs were dispersed (suspended) in a low-concentration surfactant solution, by way of example and not limitation a solution of 2 wt. % poly(sodium 4-styrensulfonate) (PSS) solution with a small amount of N-methyl-2-pyrrolidinone (NMP) was utilized in these examples, although any PSS with small amounts of NMP could be utilized as well as other surfactants. After achieving adequate suspension by bath and high-energy tip sonication, a latex solution was added to create the MWNT-latex ink, which was used as is for spraying using a an airbrush. Both the PSS and latex facilitated MWNT suspension and the deposition of films characterized by a percolated morphology and high homogeneity.

These MWNT-latex thin films were deposited on dry sand so that film-enhanced sand could be used for casting the multifunctional cement composites. The film was sprayed and deposited onto dry sand using an airbrush, although any deposition method could be utilized as desired.

Figure 3:
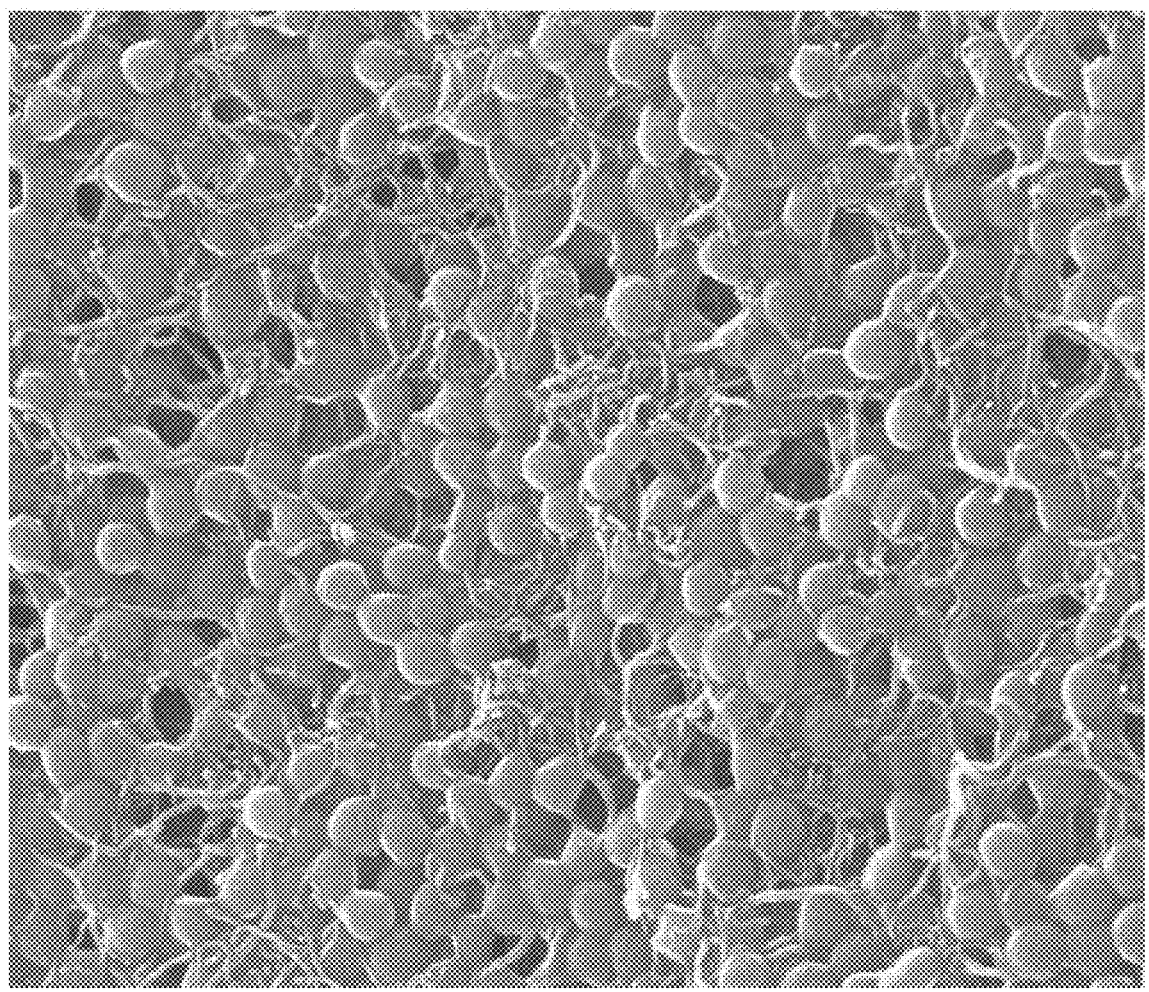
FIG. 3 is a scanning electron microscope (SEM) image of multi-walled nanotubes and latex spheres within a MWNT-latex film according to an embodiment of the present disclosure.

FIG. 3 depicts a scanning electron microscope (SEM) image of the morphology of the MWNT-latex thin film which comprises dispersed nanotubes and latex spheres.

The procedure for coating sand with the MWNT-latex film began with spreading sand on a clean flat surface. Then, the airbrush and MWNT-latex ink solution was employed for spraying a thin film onto the sand surface. The airbrush was positioned 30 cm above and perpendicular to the sand surface, while film was deposited using a sweeping motion. After applying one coating, sand was mixed thoroughly using a plastic spatula to expose any untreated sand. Airbrushing was repeated two additional times. Finally, the film-coated sand was allowed to air-dry for 1 hour, followed by drying at 50° C. for 30 minutes in a vacuum oven.

2.3 Load Testing of the Samples.

An MTS load frame equipped with a 407 controller was employed for testing mortar specimens and for characterizing their mechanical and electromechanical properties. The cubic mortar specimens were utilized for two types of testing. First, specimens without embedded electrodes were subjected to monotonic, uniaxial, compressive loading until material failure so that their mechanical properties could be characterized. The displacement-controlled test was conducted using a ramp rate of 1.905 mm/min. Eight pristine and seven thin film-enhanced mortar specimens were tested for this case.

The second set of tests was performed for characterizing the electromechanical response of mortar specimens. For this test cubic specimens with embedded copper mesh electrodes were used. The specimens were initially pre-loaded to 5,000 N, before the load frame executed a 0.1 Hz compressive cyclic load pattern to a peak strain of −0.45%, and they were subjected to a minimum of five load cycles. The load and displacement data of the load frame were recorded using a customized LabVIEW client (sampling rate: 55 Hz). In addition, resistance (e.g., DC) of the sample was also recorded simultaneously using an Agilent 34401A digital multimeter (DMM) running at a sampling rate of 2.8 Hz. It should be mentioned that, prior to each test, approximately 20 seconds of resistance data was recorded first. This data was used for quantifying the nominal resistance of the specimen, as well as for identifying any possible drift in its electrical response.

It should be mentioned that all of the specimens tested in this study were dried at 50° C. for 6 hours in a vacuum oven immediately prior to testing. It was common to conduct multiple tests on the same specimen. However, the time between each test was minimized so as to reduce experimental error induced by possible moisture changes that could arise in each specimen. In total, six pristine and six film-enhanced mortar specimens were subjected to electromechanical tests.

2.4 Spatial Damage Detection Validation.

Figure 4:
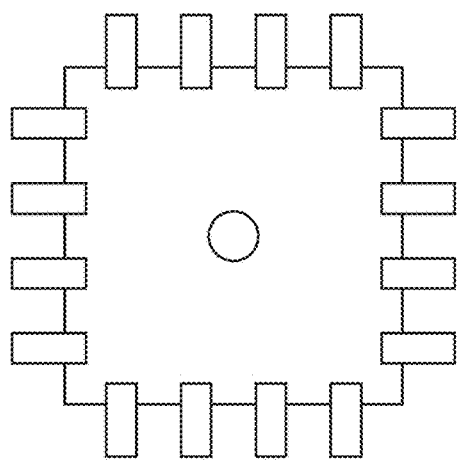
FIG. 4 is a rendition of a plate specimen cast with 4×4 contacts, and later drilled to simulate damage which was electrically detected according to an embodiment of the present disclosure.

FIG. 4 illustrates a rendition of a plate specimen with 4×4 contacts, utilized in a testing protocol to validate use of ERT (EIT) for detecting severity and location of damage occurring in these mortar specimens. For this test, only plate specimens were used that have the 4×4 copper mesh electrodes embedded within a plate of concrete made from MWNT-latex films airbrushed onto dry sand particles. A specialized data acquisition (DAQ) system was employed so as to obtain the dataset for mapping the distribution of electrical resistance in the mortar specimens. The ERT DAQ included a Keithley 6221 current source, which supplied DC on the order of 1 mA to a specific boundary electrode and with another electrode set as ground. It should be noted that the DC magnitude was set to span the voltage measurement range of the DAQ, thereby maximizing signal-to-noise ratio. An Agilent 34980A multifunction switch was employed for measuring boundary electrode voltages and for directing current input/output to appropriate electrode pairs. The ERT DAQ was controlled using a customized MATLAB program. In these tests, DC was injected across electrodes on opposite edges of the square mortar specimen (plate), while voltage was measured across adjacent boundary electrodes which were seen in the figure.

Two sets of tests were conducted for validating spatial damage detection using the film-enhanced mortar specimens coupled with the ERT technique. In either case, testing began with obtaining a baseline or undamaged spatial resistance map using the boundary voltage dataset collected by the ERT DAQ. Then, the first test involved drilling a 6.35 mm (0.25 in)-diameter hole through the center of the plate specimen for simulating damage. The DAQ was then used to interrogate the mortar specimen and to obtain the corresponding boundary voltage dataset. On the other hand, the second test used the same drill but considered the case of inflicting different levels of damage at different locations. A hole was drilled halfway through the specimen near its bottom-left corner, and this simulated minor damage in the structure. The drill was then used again, at the same location, to drill through the plate to create more severe damage. This process was repeated near the top-right corner as well. After each drilling action, the ERT DAQ was employed to interrogate and obtain the boundary voltage measurements so that the resistivity maps corresponding to each damage state could be reconstructed.

3. Results and Discussion

As mentioned in a previous section, mortar specimens were cast and subjected to both mechanical and sensing characterization tests. This section discusses the results obtained and compares the results from pristine mortar versus specimens casted using MWNT-latex thin film-coated sand.

3.1 Mechanical Properties.

Table 1 summarizes the mechanical property of Young's modulus for both the pristine and MWNT-latex thin film-enhanced mortar specimens. The first 'M' marking the samples (e.g., #M-P1) denotes mechanical tests, and the second character denotes the type of specimen, namely 'P' for pristine and 'M' for MWNT. The data presented in Table 1 was obtained from monotonic, uniaxial, compressive tests performed using the previously described 5×5×5 cm cubic mortar specimens. It should be mentioned that these tests loaded the mortar specimens until failure. However, Young's modulus was derived from the slope of the linear least-squares best-fit line applied to the initial linear portion of the stress-strain raw data. The average Young's modulus of the pristine and MWNT-latex thin film-enhanced mortar specimens was 14.0±1.2 and 6.03±0.64 GPa, respectively as seen in Table 1.

A two-sample t-test was performed using the data presented in Table 1. The parameters of the two-sample t-test were as follows:

$$H_0: \mu_{pristine} = \mu_{MWNT}$$

$$H_a: \mu_{pristine} \neq \mu_{MWNT} \quad (4)$$

where the null hypothesis ($H_0$) was that the two datasets were obtained from populations with the same sample means. The alternate hypothesis ($H_a$)) considered that the two datasets were from different populations. In other words, the two-sample t-test examined whether or not, in a statistical sense, the modification of the cement-particle interface using MWNT-latex films affected the mechanical properties of the mortar. The result of the two-sample t-test was that the null hypothesis could be rejected at the 5% significance level. It was clear from the data that the MWNT-latex films affected the stiffness of mortar. It is known that the strength and stiffness of cementitious composites are derived from the cement-particle interactions. It was possible that MWNT-latex films prevented those same types of chemical bonds to form, hence decreasing Young's modulus or stiffness of the bulk mortar specimen. Another reason may because of particle smoothing due to the MWNT-latex coating, which reduced the ability of particles to interlock and resist loads.

3.2 Nominal Electrical Properties.

In addition to the mechanical properties of the mortar specimens, their nominal or unstrained electrical properties were also quantified. DC resistances of six pristine and six MWNT-latex thin film-enhanced mortar cubic specimens were measured prior to electromechanical testing. For each specimen, about 20 seconds of resistance data (sampling rate: 2.8 Hz) was collected. The average DC resistance for each specimen was computed and presented in Table 2. In Table 2, 'E' denotes nominal electrical characterization tests, and 'P' (pristine) and 'M' (MWNT) refer to the two different types of sample sets tested in this work.

One can see from the results shown in Table 2 that the average resistivity values of mortar specimens with and without the MWNT-latex thin films were drastically different. Without considering potential outliers in the nominal resistivity data (i.e., indicated as underlined values in Table 2), it was found that the average resistivity was 23.8±2.7 and 2.14±0.48 for the pristine and film-enhanced mortar, respectively. The resistivity difference between the two sets was more than one order of magnitude, which is expected given the high electrical conductivity of carbon nanotubes and of the MWNT-latex thin films. It should be mentioned that a few of the specimens tested exhibited significant nominal resistance drifts, and those outlier results were not included in this study.

3.3 Sensing Response Characterization.

The electromechanical properties of cubic mortar specimens were characterized by conducting compressive cyclic tests. During these tests, the DC resistance of the specimens was recorded, along with its force-deformation response. It should be noted that the peak compressive strain that was applied was approximately −0.45%. This peak strain was selected to ensure that the mortar specimens remained linear-elastic and free from damage.

Figure 5A:
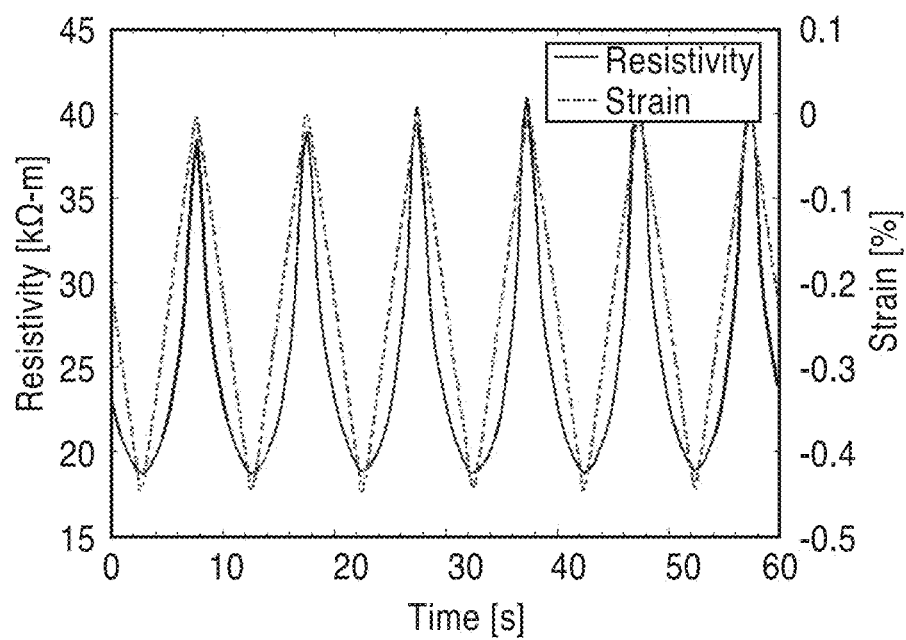
FIG. 5A through FIG. 6B are plots of electromechanical tests on MWNT-latex cementitious composites according to an embodiment of the present disclosure.
Figure 6A:
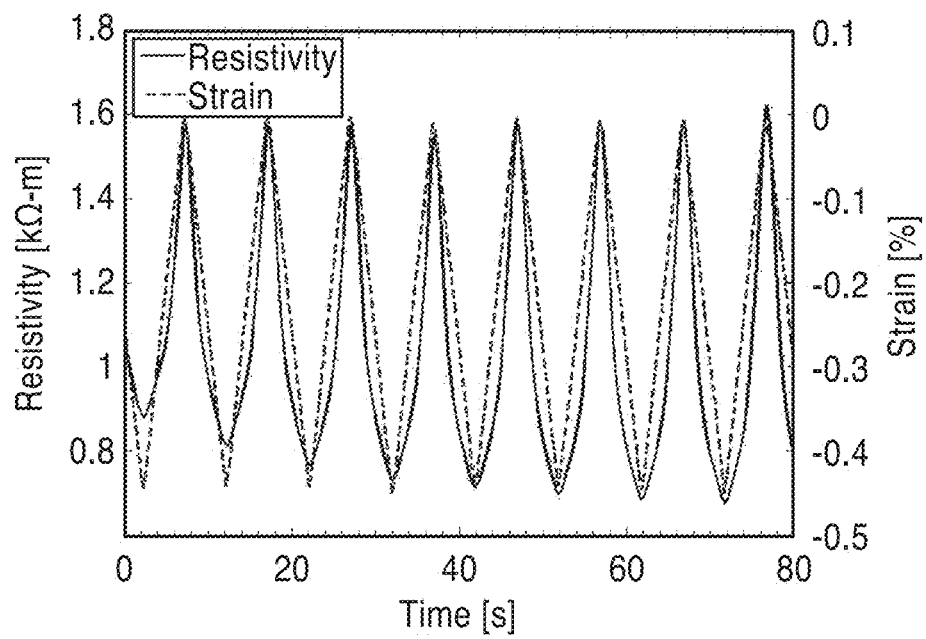

FIG. 5A and FIG. 6A depict two representative results of the electromechanical tests; with the plots showing resistivity time histories of the mortar specimens overlaid with that of the applied strain patterns. Both sets of these results were for mortar specimens that incorporated MWNT-latex thin films. As expected, the test results showed that the electrical properties of the mortar specimens were sensitive to applied strains. In addition, resistivity decreased in tandem with decreasing strains (i.e., with greater magnitudes of applied compressive strains). It should be mentioned that the pristine mortar specimens also exhibited similar resistivity changes with respect to applied compressive loading. It can also be seen from FIG. 5A and FIG. 6A that resistivity change was synchronized with that of the applied strains, and sensitivity to strain for the specimens was stable and repeatable.

While no significant nominal resistivity drift was observed during loading, resistivity drift was present during the initial 20 seconds of resistance measurements. For most cases, the nominal resistivity drift plateaued quickly, and tests were conducted after such drifts disappeared. In fact, an earlier study showed that the nominal resistivity drift of cement paste specimens with ultra-low concentrations of MWNTs would eventually plateau after repeated cyclic loading. It was suspected that resistivity drift occurred because of electric charging or polarization. It is worth noting that these charging effects could for example be counteracted by using techniques such as applying a linear fit to the data or by pre-charging the cementitious composite. Nevertheless, one can see from FIG. 6A that the nominal resistivity of the specimen was just beginning to plateau during the first few loading cycles.

Figure 5B:
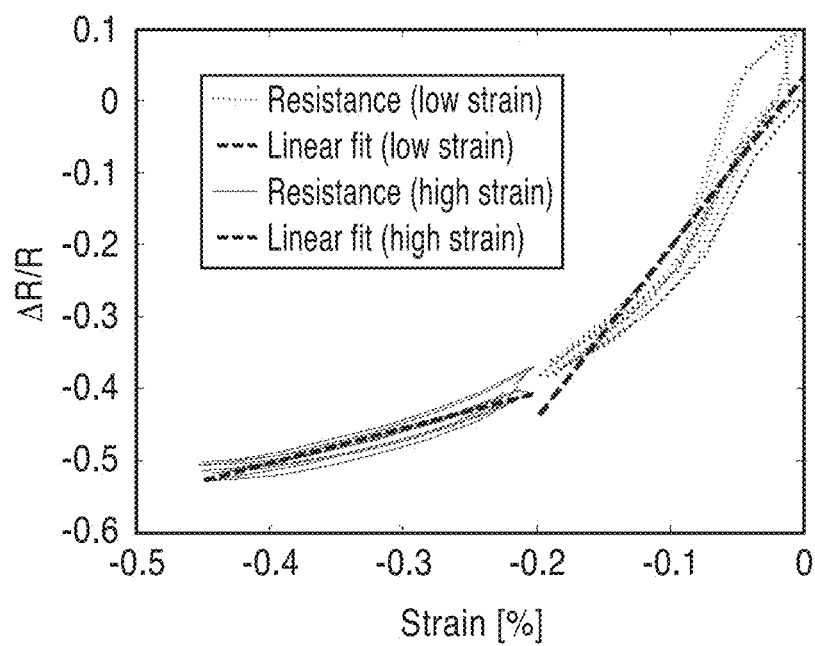
Figure 6B:
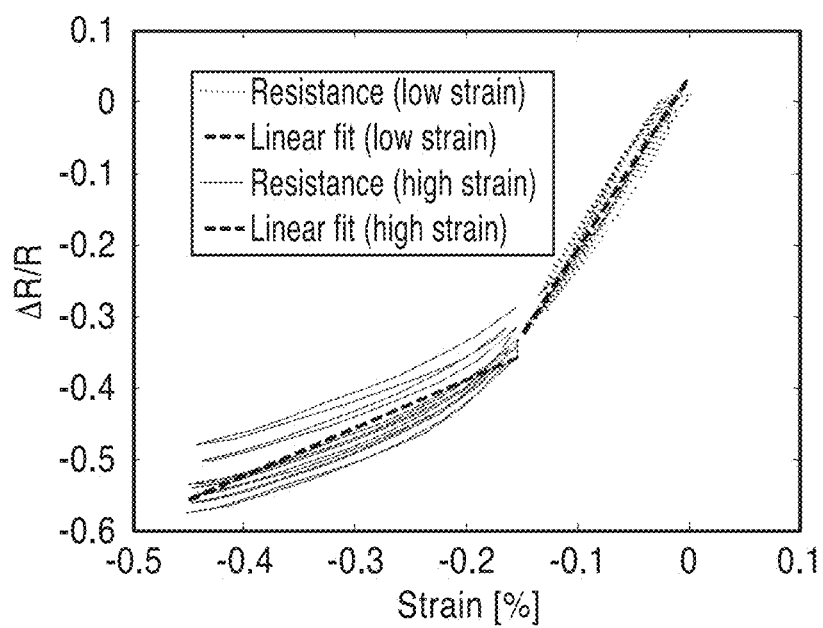

FIG. 5B and FIG. 6B show for both of the aforementioned specimen types, the same sets of data converted to show normalized change in resistivity plotted with respect to applied strains. Both FIG. 5B and FIG. 6B show that the electromechanical response of the mortar specimens (i.e., for those enhanced with the MWNT-latex thin film interface) exhibited bi-linear sensitivity to strain. This observation was true and extended to all of the specimens tested in this study. In addition, a linear least-squares regression line was fitted to the two linear portions for each dataset so as to determine the strain sensitivity (S) or gage factor, which can be calculated by the following:

$$S = \frac{\Delta \rho / \rho_0}{\Delta \varepsilon} \quad (5)$$

where $\rho_0$ is the nominal or unstrained resistivity, and $\Delta \rho$ is the change in specimen resistivity corresponding to the change in applied strains ($\Delta \varepsilon$).

Eq. (5) was employed for estimating the low-strain and high-strain strain sensitivities for all the electromechanical test results. Since each mortar specimen was subjected to multiple loading cycles, low-strain S and high-strain S were calculated for each cycle. An average strain sensitivity for the low-strain, as well as another for the high-strain range, were reported. The results are summarized in Table 3. In Table 3, the specimens are denoted as 'S' for sensing characterization; the notations for 'M' and 'P' follow the same definitions for MWNT specimens and pristine specimens and previously mentioned.

It should be mentioned that the pristine mortar specimens did not exhibit bilinear strain sensitivity. As a result, each pristine mortar specimen was characterized by an average strain sensitivity value, as opposed to being separated to that of low-strain and high-strain; those results are tabulated in Table 4. For comparison purposes, Table 3 also includes the strain sensitivities computed using the entire dataset ($S_{complete}$ and in particular to a linear least-squares regression line was fitted to the entire data for each cycle of loading.

One can observe from the results shown in Table 3 that the average low-strain gage factor ($S_{low-strain}$ was very impressive at 229±60. This sensitivity was valid for applied strains between 0% and approximately 0.2%. After this point, the average high-strain gage factor ($S_{high-strain}$) was 65±11. From representative plots shown in FIG. 6B and FIG. 7B, it is clear that bi-linear sensitivity was justified and that within each low- or high-strain regime, linearity was strong. It is hypothesized that this bilinear response was observed because, during initial loading, slight changes in orientation of MWNT-latex thin film-coated sand particles could occur and make contact with another particle, thereby changing the electrical properties of the bulk specimen in a dramatic fashion. Localized high stresses acting on the film surface could also explain why such drastic changes in electrical properties were observed, especially since these MWNT-latex thin films are piezoresistive. After this point, it is hypothesized that strain sensitivity is dominated by the cementitious matrix, although electrical conductivity of the bulk mortar is still enhanced with the presence of the MWNT-latex thin film.

In contrast, the pristine mortar specimens did not exhibit bilinear strain sensitivity, and its average strain sensitivity was much lower, approximately 61±22. As compared to the MWNT-latex thin film-enhanced mortar, the pristine mortar possessed gage factors similar to that of $S_{high-strain}$ for the MWNT-based specimens. The comparable strain sensitivity makes sense, since it was hypothesized that the cementitious matrix was contributing to most of the electromechanical response observed. However, it should be mentioned that the standard deviation for the pristine mortar was 22, which is twice that of the MWNT-based specimens at 11. In fact, the signal-to-noise ratio (SNR) and sensing resolution of the pristine mortar specimens was fairly low. Thus, despite comparable high-strain gage factors, the advantages offered by modifying the cement-sand particle interface with MWNT-latex thin films were the improved SNR, sensing resolution, and repeatability of measurements.

3.4 Spatial Damage Detection.

Once the electromechanical properties of mortar specimens were characterized, the final phase of this study was to validate spatial damage detection. Plate specimens with a plurality of conductive electrodes, by way of example and not limitation 16 embedded copper tape electrodes (4×4) were cast, following steps outlined in a previous section. It should be mentioned that only MWNT-based mortar plates were investigated, because preliminary tests showed that electrical current could not be effectively propagated through pristine mortar specimens. Because of this, spatial resistivity mapping of pristine mortar using the ERT method was not possible.

Therefore, using the MWNT-latex thin film-enhanced plate specimens, two sets of damage detection tests were conducted, as was described in a previous section.

Figure 7:
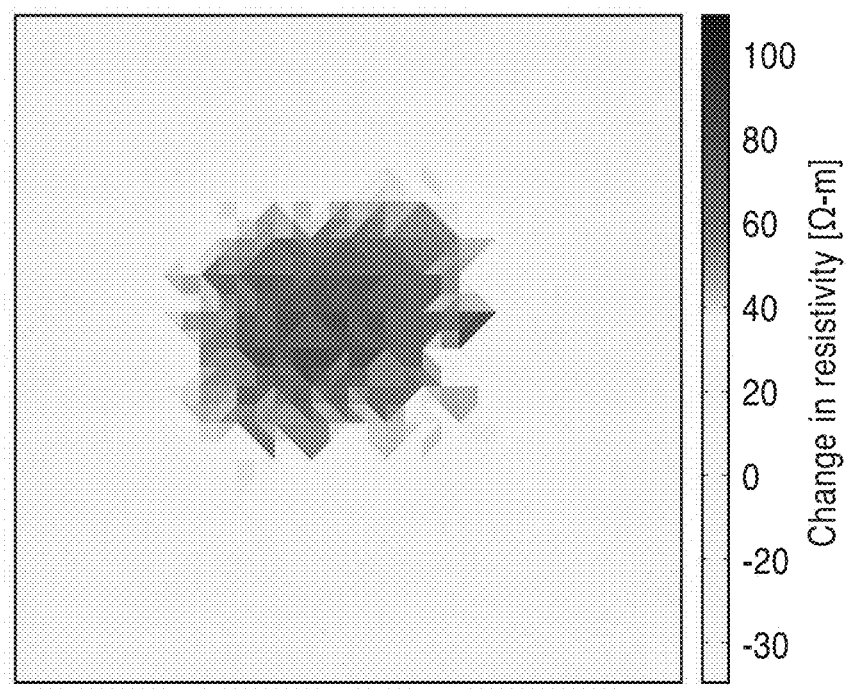
FIG. 7 is an image of a spatial resistivity map for cast plate damage seen in FIG. 4, as obtained according to an embodiment of the present disclosure.

FIG. 7 depicts an example spatial resistivity map obtained in response to executing the ERT method using the undamaged and damaged boundary voltage datasets of a 5×5×1 cm plate after a 6.35 mm-diameter hole was drilled through the center of the specimen (as seen in FIG. 4). It should also be mentioned that the resistivity map shown in FIG. 7 depicts the change in spatial resistivity distribution of the damaged ERT map relative to its undamaged baseline. Regardless, one can see that the figure clearly identifies an increase in resistivity corresponding to the location of the actual drilled hole. The estimated size of damage is slightly larger than the actual damage, and this is most likely due to the inherent resolution of the ERT method, which is governed in part by electrode size and spacing. Nevertheless, FIG. 7 validates the ERT method and spatial damage detection capabilities.

Figure 8A:
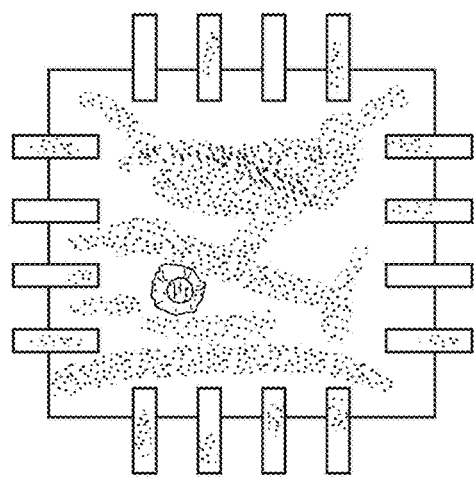
FIG. 8A through FIG. 8F are renditions of damaged cast plates of MWNT-latex cementitious composite (FIG. 8A, FIG. 8C, FIG. 8E), and associated spatial resistivity map images (FIG. 8B, FIG. 8D, FIG. 8F) obtained according to an embodiment of the present disclosure.
Figure 8B:
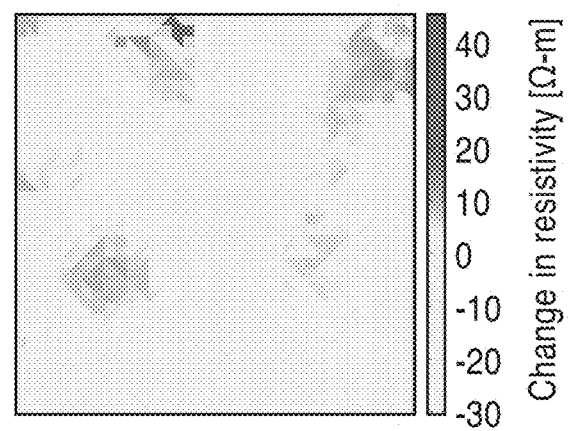
Figure 8C:
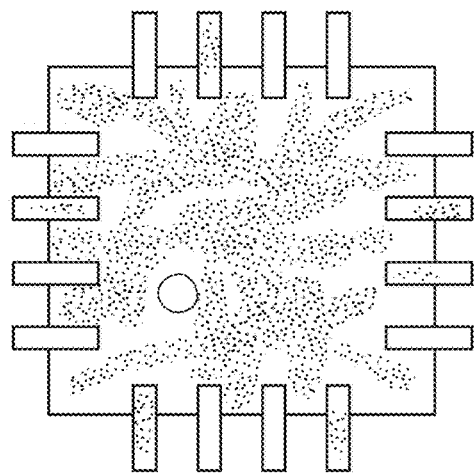
Figure 8D:
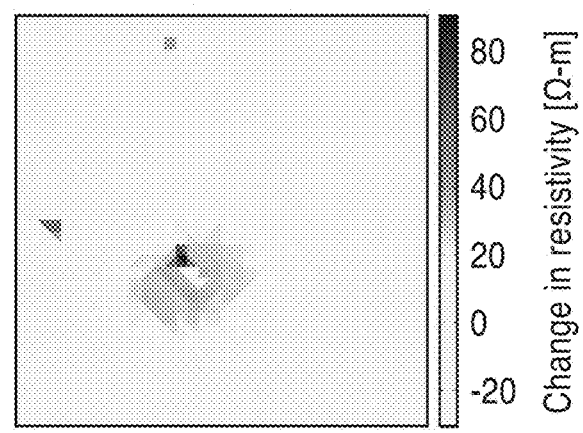
Figure 8E:
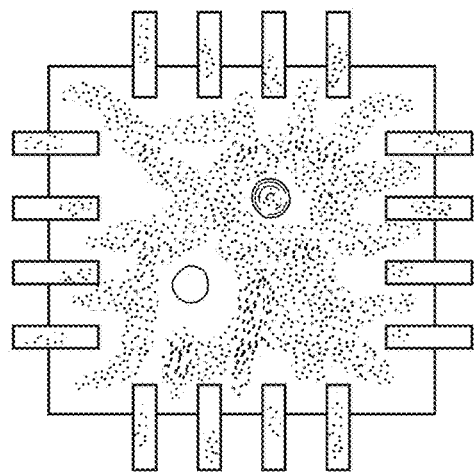
Figure 8F:
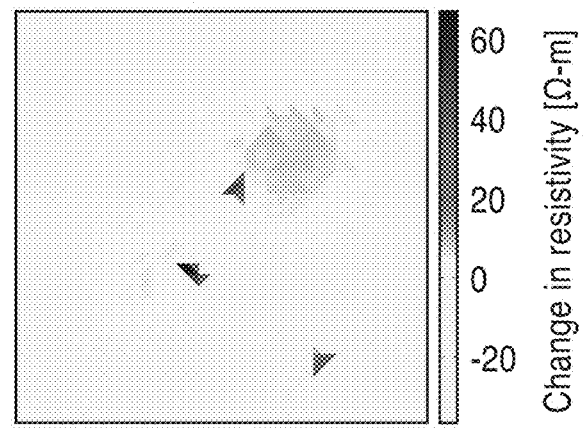

FIG. 8A through FIG. 8F illustrate a comparison of mechanical damage (FIG. 8A, FIG. 8C and FIG. 8E) and the results of the detection method (FIG. 8B, FIG. 8D and FIG. 8F). As described in a previous section an additional set of tests using these plates was also conducted. Instead of detecting binary cases (i.e., whether or not damage exists in the structure), this test sought to validate the performance of the MWNT-based mortar and ERT method for monitoring and detecting the severity and location of progressive damage. First, a partial hole (about 50% through the depth of the specimen) was drilled near the lower-left corner of the plate (FIG. 8A).

The ERT method was used for reconstructing the change in spatial resistivity, which again, used both undamaged and damaged boundary voltage data. The resulting spatial resistivity map is shown in FIG. 8B. One can see from the figure that the resistivity map successfully identifies localized increases in resistivity corresponding to the location of the partially drilled hole. However, one can also see that some errors in the ERT reconstruction are also present, where resistivity changes near the top-right electrode was also observed. This could be due to contact impedance issues during boundary voltage data acquisition.

The experiment continued by completely drilling through the same location, as can be seen in FIG. 8C. FIG. 8D shows the resistivity map obtained by computing the difference between this new damage state (i.e., through-hole) and the previous damage state (i.e., about 50% drilled hole as shown in FIG. 8B). As expected, FIG. 8B shows that additional damage accumulated in the structure since the last measurement, and its location is close to that of the actual hole. Similar results were also obtained with the introduction of the next damage state (i.e., partially drilled hole near the top-right corner of the plate), which is shown in FIG. 8E. The resistivity map shown in FIG. 8F once again shows the presence of new damage and identifies its correct location.

As was mentioned in a previous section, this test continued with the drilling of the through-hole at the top-right corner of the plate. However, all of the specimens failed (i.e., broke in half) during the application of this final damage state. As a result of specimen failure, boundary voltage data could not be obtained, and the corresponding ERT spatial resistivity map was not generated. All in all, the results shown in FIG. 7 and FIG. 8A through FIG. 8F demonstrated that there is potential for MWNT-latex thin film-enhanced mortar specimens, when coupled with ERT methods, to be able to detect spatially distributed structural damage.

The scalability limits of this technology remain for investigation, especially since ERT (and EIT) require that electrical current be propagated between all electrodes. The problems with high resistivity (or low conductivity) for ERT reconstruction, may perhaps be overcome by leveraging the unique technique of using MWNT-latex thin films for modifying the interface between cement and sand particles. Additional investigation remains on characterizing the electromechanical properties of concrete specimens (i.e., with aggregate) enhanced with these MWNT-latex thin films.

4. Results from Sand and Aggregate Coated Composites

Additional testing was performed with coating both the sand and aggregates. Again, the concrete mix design employed in this study followed the Federal Aviation Administration (FAA) runway rigid pavement guidelines, with type I/II Portland cement and 25 wt. % (of total cementitious material) type F ground granulated blast furnace slag (GGBFS) were used. The fine aggregates were crushed granite with a density of 2.71 g/cm3 and a minimum sieve size of 0.149 mm, and a 2:1 sand-to-cement ratio was employed. The large aggregates were 19 mm (0.75 in) river rock with a specific gravity of 2.7, and an aggregate-to-cement ratio of 3:1 was used. Selection of both fine and large aggregates conformed to the FAA guidelines on gradation. All of the aggregates were cleaned and oven-dried at 80° C. for 24 hours and then allowed to cool to room temperature for 1 hour, before MWNT-latex thin films were deposited on their surfaces. Water-to-cement (w/c) ratios ranging from 0.42 to 0.44 were used along with an Advacast superplasticizer (SPL). A range of w/c ratios was utilized due to different casting environments and ambient temperatures, but the SPL concentration was maintained at 3.5 mL/kg for all the specimens.

Distinct differences were found between coating only the sand, and coating aggregates in addition to the sand material. When comparing the results it was found that the signal-to-noise ratio (SNR) is higher (i.e., the magnitude of the change in resistivity is larger) for concrete casted using both sand and aggregates coated with the conductive nanomaterial-polymer, exemplified in these tests as MWNT-latex thin films. This result was observed because these specimens were characterized by higher electrical conductivity due to the presence of more conductive cement-aggregate interfaces. It should be appreciated that spatial damage detection is only possible when current can propagate through the entire body, with its path being significantly perturbed by damage (or localized resistivity or conductivity changes) so that boundary voltage changes can be observed. Otherwise, the use of ERT/EIT would not be able to detect changes in resistivity from the inverse analysis.

Table 5 depicts results from a simple cost analysis comparing the disclosed technique of modifying cement-aggregate interfaces using MWNT-latex thin films versus the current state-of-art of directly dispersing carbon nanotubes in the cement matrix. The table summarizes the increase in estimated costs (in U.S. dollars) of MWNTs required assuming that 256 kg of cementitious content is needed for 1 cubic meter of concrete (based on FAA guidelines). All weight percentage concentrations of carbon nanotubes are with respect to the amount of cement or cementitious material used in the mix design. The larger weight percentages (top rows of the table) are comparable to the quantities used in the prior art. The last two rows of the table correspond to concrete specimens presented in this disclosure, with MWNT concentrations calculated based on the total weight of nanotubes used during ink preparation and spray fabrication (i.e., material lost during spray coating was accounted for in these calculations and represents opportunities for further lowering the cost of this technique).

Accordingly, given that the average price of concrete is currently approximately $122 (USD) per cubic meter, significant cost increases are incurred if CNTs/MWNTs are directly dispersed in the cement matrix. For instance, concrete containing 0.5 wt. % of MWNTs would incur 52 times additional costs as compared to pristine concrete. In comparison, sand-coated specimens in this study would incur dramatically less cost increase. The lower cost of modifying cement-aggregate interfaces makes this an attractive technique for real-world, practical implementations of this material. It should be noted that the specimens cast in this study have not been optimized for sensing and mechanical performance, and further reductions in cost are possible.

5. Conclusions

In this study, a novel technique of incorporating conductive nanomaterials in cementitious composites was described, in which the cement-aggregate particle interface was modified using highly conductive nanomaterials, exemplified as CNT-, or MWNT-based thin films. In particular, an airbrushing technique was employed for depositing nanomaterial-latex thin films onto aggregates before being used for casting cementitious structure specimens. Then, untreated and film-coated aggregates were used for casting 5×5×5 cm cubic and 5×5×1 cm plate specimens. The mechanical, nominal electrical, and electromechanical properties of both pristine and MWNT-based specimens were characterized and compared. All specimens were tested after drying in a vacuum oven at 50° C.

First, monotonic, uniaxial compressive load tests revealed the stress-strain characteristics of the mortar specimens. It was found that the Young's moduli of pristine and MWNT-based mortar were 14 and 6 GPa, respectively. The differences were statistically significant in that the MWNT-latex coating on the sand appeared to have modified the intrinsic mechanical properties of the mortar.

Second, the electrical and sensing characterization tests showed that incorporation of MWNT-latex thin films decreased mortar resistivity by more than an order of magnitude. In addition, while both types of mortar specimens exhibited electrical properties that were sensitive to strain, those with the added MWNT films showed bi-linear response to applied strains. At low strains, the sensitivity was extremely high with an average of approximately 229. At applied strains greater than 0.2%, both types of specimens had comparable sensitivities of about 61 to 65. However, mortar with embedded thin films exhibited greater signal-to-noise ratio, sensing resolution, repeatability, and less nominal resistance drift.

Lastly, an electrical resistance tomography method was implemented for back-calculating the spatial resistivity map (or distribution) of MWNT-based mortar specimens for damage detection applications. Plate specimens instrumented with 16 boundary electrodes (in a 4×4 pattern) were subjected to artificial damage due to drilled holes at either the center or near the corners of specimens. The results from all the tests showed very promising results, in which the ERT method correctly estimated the spatial resistivity distribution of the mortar plates. In addition, the spatial resistivity maps also showed localized increases in resistivity corresponding to the locations and sizes of drilled holes. These tests successfully validated ERT for spatial damage detection. Future work will consider the use of MWNT-latex films for modifying cement-sand-aggregate interfaces, as well as how to scale up the technology for real-world and full-scale applications.

6. Additional Testing and Discussion

Figure 9:
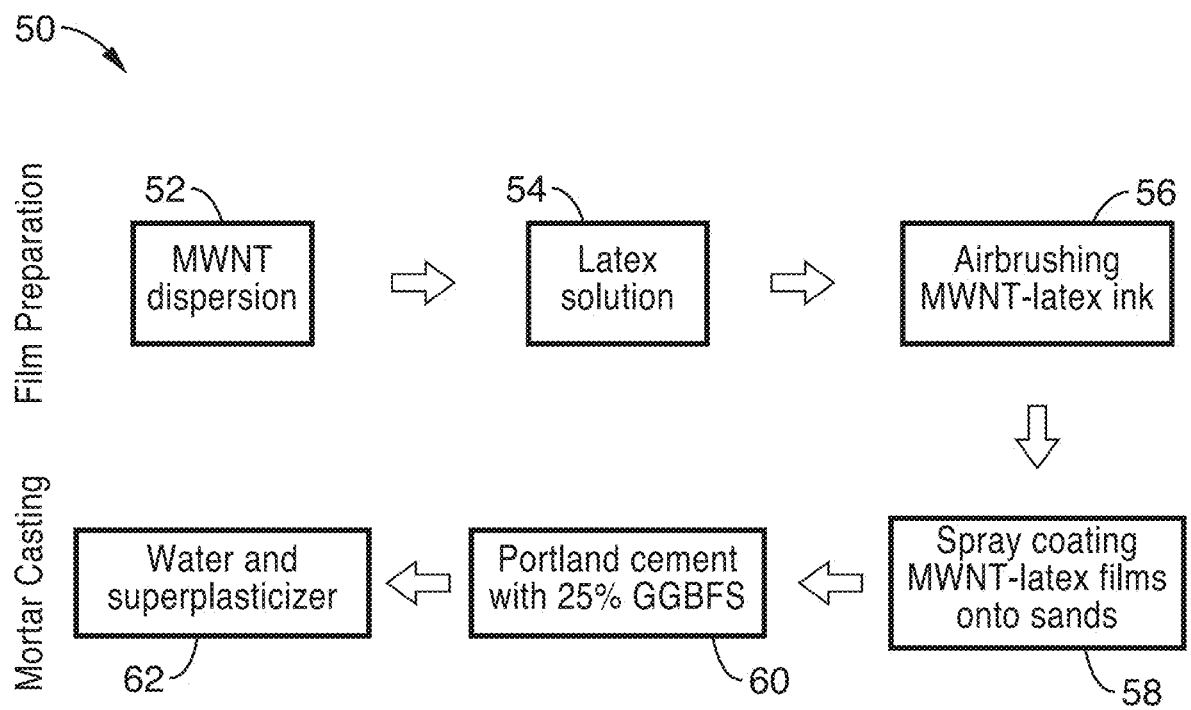
FIG. 9 is a flow diagram of a process for preparing MWNT-latex films and casting an MWNT-latex cementitious composite structure according to an embodiment of the present disclosure.

FIG. 9 is an example embodiment 50 which summarizes the steps in preparing the films and casting the mortar for the performed tests. The multi-walled nanotube (MWNT) material was dispersed 52, mixed into a latex solution 54, then applied 56 (deposited) preferably by an atomizing, or airbrushing, mechanism onto sands 58, which were then incorporated into the remaining cementitious materials 60 (e.g., Portland cement and 25% GGBFS), to which was added 62 water and preferably superplasticizer, which was well mixed and cast into the desired structure.

FIG. 10A through 10H indicate some additional tests of cast plates which incorporated this MWNT-latex sprayed sand. FIG. 10A through FIG. 10D depict different damage (i.e., drilling) created in a cast plate of mortar, while FIG. 10E through FIG. 10H illustrate damage as EIT spatial resistivity maps according to method of the present disclosure.

Figure 11A:
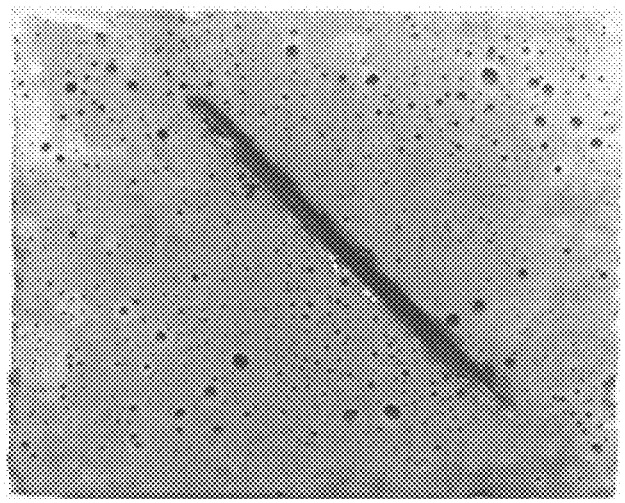
FIG. 11A and FIG. 11B are an image of an artificial crack-damaged cast plate of MWNT-latex cementitious composite (FIG. 11A) and its associated spatial resistivity map image (FIG. 11B) as obtained according to an embodiment of the present disclosure.
Figure 11B:
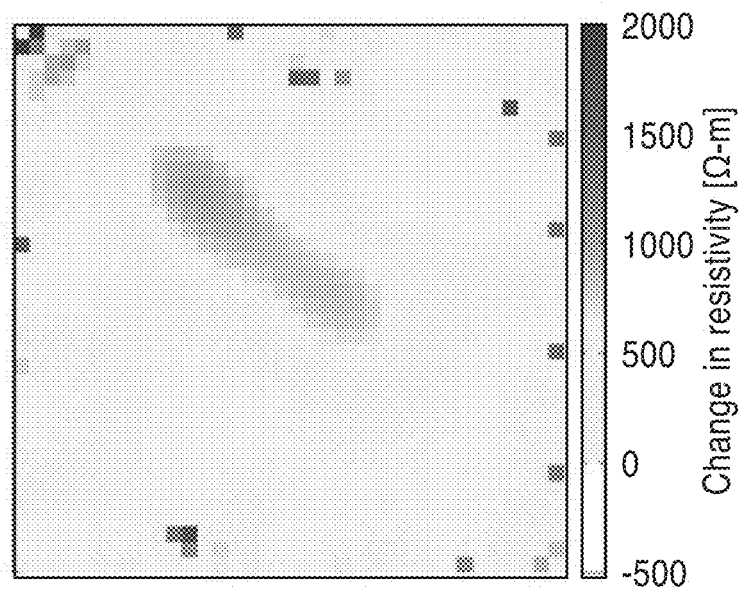

FIG. 11A and FIG. 11B indicate additional tests of cast plates, containing the MWNT-latex sprayed sand, in which an artificial crack was created. FIG. 11A depicts the crack damage, while FIG. 11B depicts damage determined electrically as an EIT spatial resistivity map according to the present disclosure.

From the description herein, it will be appreciated that that the present disclosure encompasses multiple embodiments which include, but are not limited to, the following:

1. A method of producing a multifunctional cement composite concrete with self-sensing properties, the method comprising: (a) producing a nanomaterial-polymer solution; (b) coating aggregate particles with a thin film of said solution; and (c) mixing the coated aggregate particles with a cementitious composition into a mortar or concrete composition; (d) wherein said mortar or concrete composition has a characteristic resistivity and strain sensitivity; and (e) wherein damage or defects in a cast structure made with the cementitious mortar or concrete composition can be determined by resistivity differences.

2. The method of any preceding embodiment, wherein said conductive nanomaterial-polymer solution comprises conductive nanomaterials added to a polymeric material, the combination dispersed with a low concentration aqueous surfactant solution into a thin film solution.

3. The method of any preceding embodiment, wherein said aggregate particles comprise small aggregates and/or large aggregates.

4. The method of any preceding embodiment, wherein the coated aggregate particles are mixed with a cementitious mortar composition in a desired aggregate to cement composition ratio.

5. The method of any preceding embodiment, further comprising introducing electrodes into the cementitious mortar or concrete composition as it is cast into a structure.

6. The method of any preceding embodiment, further comprising measuring resistance between said electrodes and back-calculating a spatial resistivity map utilizing electrical resistance tomography (ERT), or electrical impedance tomography (EIT), to determine damage and/or defects in the resultant structure.

7. A method of localizing damage in cement composites, the method comprising: (a) producing a conductive nanomaterial-polymer solution; (b) coating aggregate particles with a thin film of said solution; (c) mixing the coated aggregate particles with a cementitious composition into a wet mortar or concrete composition; (d) casting said wet mortar or concrete composition into a mold into which are retained a plurality of electrode; (e) curing said molded mortar or concrete composition into a cured mortar or concrete structure; and (f) determining defects or damage within the cured mortar or concrete structure by measuring resistivity between electrodes and utilizing back-calculation of a spatial resistivity map using electrical resistance tomography (ERT), or electrical impedance tomography (EIT).

8. The method of any preceding embodiment, wherein said aggregate particles comprise small aggregates and/or large aggregates.

9. The method of any preceding embodiment, wherein resistivity was measured in response to injecting a current between different electrodes on opposing sides of the cured mortar or concrete structure and measuring voltage across adjacent boundary electrodes.

10. The method of any preceding embodiment, wherein said conductive nanomaterial-polymer solution comprises conductive nanomaterials added to a polymer material, the combination dispersed with a low concentration aqueous surfactant solution into a thin film solution.

11. The method of any preceding embodiment, wherein said conductive nanomaterials comprise conductive nanotubes, or multiwall conductive nanotubes.

12. The method of any preceding embodiment, wherein said conductive nanotubes, or multiwall conductive nanotubes, are comprised of carbon.

13. The method of any preceding embodiment, wherein the coated aggregate particles are mixed with a cementitious mortar composition in a desired aggregate to cement composition ratio.

14. A multifunctional cement composite, comprising: (a) fine and/or coarse aggregates; (b) a thin film coating of a conductive nanomaterial-polymer solution onto said fine aggregates and/or said course aggregates; and (c) a cementitious composite composition into which said thin film coated aggregate particles are incorporated to form a multifunctional cement composite; (d) wherein structures cast using this a multifunctional cement composite have a characteristic resistivity and strain sensitivity; and (e) wherein damage or defects in a cast structure can be identified by resistivity differences.

15. The composition of any preceding embodiment, wherein said fine aggregates comprise sand, and said coarse aggregates comprise rocks.

16. The composition of any preceding embodiment, wherein said conductive nanomaterial-polymer solution comprises conductive nanomaterials combined with a polymer material, the combination dispersed with a low concentration aqueous surfactant solution into a thin film solution.

17. The composition of any preceding embodiment, wherein said conductive nanomaterials comprise conductive nanotubes, or multiwall conductive nanotubes.

18. The composition of any preceding embodiment, wherein said conductive nanotubes, or multiwall conductive nanotubes, are comprised of carbon.

19. The composition of any preceding embodiment, wherein the coated aggregates are mixed with the cementitious composite in a desired ratio.

20. The composition of any preceding embodiment, further comprising: electrodes retained in said cementitious composite composition when it is cast; and wherein defects or damage can be determined within the cementitious composite composition after it is cured by measuring resistivity between said electrodes and back-calculating a spatial resistivity map utilizing electrical resistance tomography (ERT), or electrical impedance tomography (EIT).

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Comparing Mechanical Properties of Mortar Specimens

| Pristine Mortar | E [ksi] | E [GPa] | MWNT Mortar | E [ksi] | E [GPa] |
|---|---|---|---|---|---|
| #M-P1 | 2,060 | 14.2 | #M-M1 | 800 | 5.52 |
| #M-P2 | 1,980 | 13.7 | #M-M2 | 905 | 6.24 |
| #M-P3 | 2,210 | 15.2 | #M-M3 | 820 | 5.65 |
| #M-P4 | 2,280 | 15.7 | #M-M4 | 750 | 5.17 |
| #M-P5 | 1,890 | 13.0 | #M-M5 | 950 | 6.55 |
| #M-P6 | 1,730 | 11.9 | #M-M6 | 1020 | 7.03 |
| #M-P7 | 1,990 | 13.7 | #M-M7 | 876 | 6.04 |
| #M-P8 | 2,100 | 14.5 | — | — | — |
| Average | 2,030 | 14.0 | Average | 874 | 6.03 |
| Standard Deviation | 175 | 1.2 | Standard Deviation | 92.7 | 0.64 |

TABLE 2

Comparing Electrical Properties of Mortar Specimens

| Pristine Mortar | Avg. Resistivity [kΩ-m] | MWNT Mortar | Avg. Resistivity [kΩ-m] |
|---|---|---|---|
| #E-P1 | 22.9 | #E-M1 | 38.5 |
| #E-P2 | 21.9 | #E-M2 | 2.8 |
| #E-P3 | 27.8 | #E-M3 | 2.38 |
| #E-P4 | 22.5 | #E-M4 | 2.12 |
| #E-P5 | 2.73 | #E-M5 | 1.82 |
| #E-P6 | 2.77 | #E-M6 | 1.56 |
| Average | 23.8 | Average | 2.14 |
| Standard Deviation | 2.7 | Standard Deviation | 0.48 |

TABLE 3

Strain Sensitivities for MWNT Mortar

| Specimen | #S-M1 | #S-M2 | #S-M3 | #S-M4 | #S-M5 | #S-M6 | Average |
|---|---|---|---|---|---|---|---|
| Low-Strain Gage Factor ||||||||
| $S_{low\text{-}strain}$ | 273 | 136 | 178 | 292 | 253 | 242 | 229 ± 60 |
| High-Strain Gage Factor ||||||||
| $S_{high\text{-}strain}$ | 56.5 | 87.2 | 59.6 | 62.9 | 61.0 | 63.9 | 65 ± 11 |
| Entire Dataset Gage Factor ||||||||
| $S_{complete}$ | 114 | 128 | 111 | 144 | 131 | 119 | 125 ± 12 |

TABLE 4

Strain Sensitivities for Pristine Mortar

| Specimen | #S-P1 | #S-P2 | #S-P3 | #S-P4 | #S-P5 | #S-P6 | Average |
|---|---|---|---|---|---|---|---|
| $S_{complete}$ | 77.7 | 85.0 | 75.6 | 58.8 | 40.3 | 30.2 | 61 ± 22 |

TABLE 5

Cost Matrix for Additional Cost for Adding MWNT

| MWNT Content by wt % | Additional Cost per cubic Meter |
| --- | --- |
| 0.5 | $6,400 |
| 0.1 | $1,280 |
| 0.05 | $ 640 |
| 0.034 (sand-coated) | $ 435 |
| 0.025 (aggregate-coated) | $ 320 |

Above table is based on an MWNT unit price of $5000/kg

What is claimed is:

1. A method of producing a multifunctional cement composite concrete with self-sensing properties, the method comprising:
    (a) producing a conductive nanomaterial-polymer solution, wherein the conductive nanomaterial-polymer solution comprises a conductive nanomaterial, a polymer, and latex;
    (b) disposing a thin film of the conductive nanomaterial-polymer solution onto aggregate particles to coat the aggregate particles with the thin film of the conductive nanomaterial-polymer solution prior to mixing in step (c); and
    (c) mixing the thin-film-coated aggregate particles with a cementitious composition into a mortar or concrete composition;
    (d) wherein said mortar or concrete composition has a resistivity and strain sensitivity; and
    (e) wherein damage or defects in a cast structure made with the cementitious mortar or concrete composition can be determined by resistivity differences.

2. The method as recited in claim 1, wherein said conductive nanomaterial-polymer solution comprises conductive nanomaterials added to a polymeric material, the combination dispersed with an aqueous surfactant solution into said conductive nanomaterial-polymer solution.

3. The method as recited in claim 1, wherein said aggregate particles comprise small aggregates and/or large aggregates.

4. The method as recited in claim 1, wherein the coated aggregate particles are mixed with a cementitious mortar composition based on an aggregate to cement composition ratio ranging from 2:1 to 3:1.

5. The method as recited in claim 1, further comprising introducing electrodes into the cementitious mortar or concrete composition as it is cast into a structure.

6. The method as recited in claim 5, further comprising measuring resistance between said electrodes and back-calculating a spatial resistivity map utilizing electrical resistance tomography (ERT), or electrical impedance tomography (EIT), to determine damage and/or defects in the resultant structure.

7. A method of localizing damage in cement composites, the method comprising:
    (a) producing a conductive nanomaterial-polymer solution, wherein the conductive nanomaterial-polymer solution comprises a conductive nanomaterial, a polymer, and latex;
    (b) depositing a thin film of the conductive nonmaterial-polymer solution onto aggregate particles to coat the aggregate particles with the thin film of the conductive nanomaterial-polymer solution prior to mixing in step (c);
    (c) mixing the thin-film-coated aggregate particles with a cementitious composition into a wet mortar or concrete composition;
    (d) casting said wet mortar or concrete composition into a mold into which are retained a plurality of electrodes;
    (e) curing said molded mortar or concrete composition into a cured mortar or concrete structure; and
    (f) determining defects or damage within the cured mortar or concrete structure by measuring resistivity between the plurality of electrodes and utilizing back-calculation of a spatial resistivity map using electrical resistance tomography (ERT), or electrical impedance tomography (EIT).

8. The method as recited in claim 7, wherein said aggregate particles comprise small aggregates and/or large aggregates.

9. The method as recited in claim 7, wherein resistivity was measured in response to injecting a current between a pair of electrodes of the plurality of electrodes on opposing sides of the cured mortar or concrete structure and measuring voltage across adjacent boundary electrodes of the plurality of electrodes.

10. The method as recited in claim 7, wherein said conductive nanomaterial-polymer solution comprises conductive nanomaterials added to a polymer material, the combination dispersed with an aqueous surfactant solution into said conductive nanomaterial-polymer solution.

11. The method as recited in claim 10, wherein said conductive nanomaterials comprise conductive nanotubes, or multiwall conductive nanotubes.

12. The method as recited in claim 11, wherein said conductive nanotubes, or multiwall conductive nanotubes, are comprised of carbon.

13. The method as recited in claim 7, wherein the coated aggregate particles are mixed with a cementitious mortar composition based on an aggregate to cement composition ratio ranging from 2:1 to 3:1.

* * * * *